L. WEIMERSKIRCH.
TRAP.
APPLICATION FILED MAR. 28, 1918.
1,284,165. Patented Nov. 5, 1918.
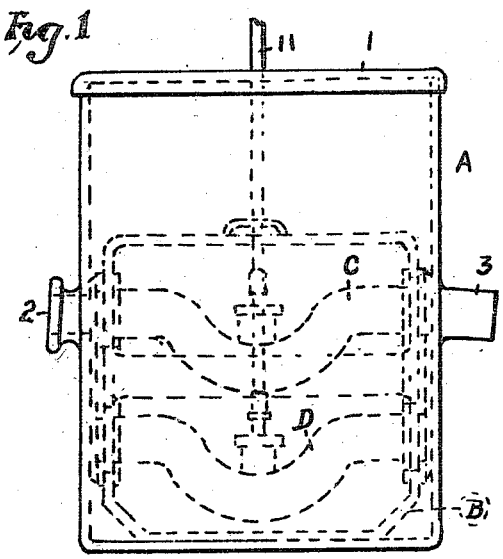
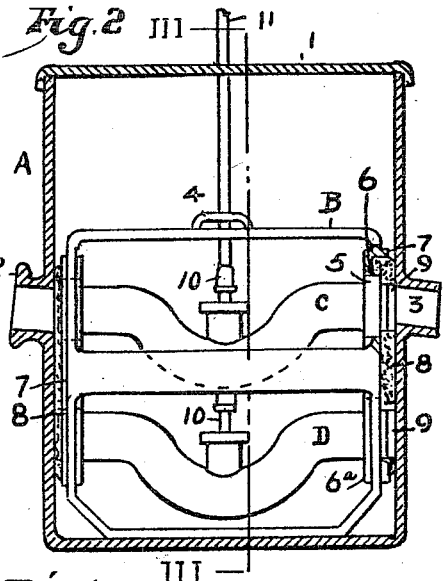
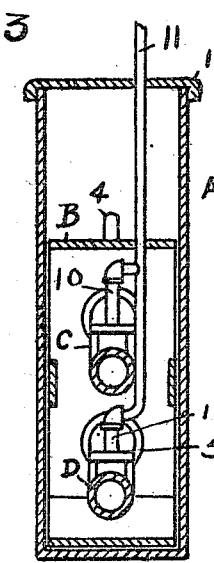
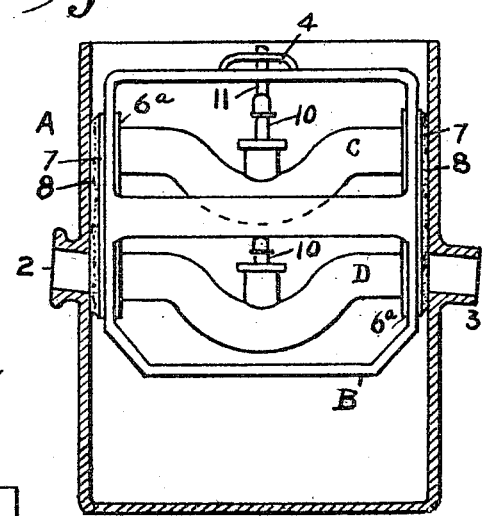
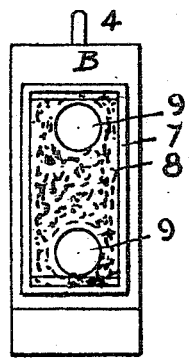

UNITED STATES PATENT OFFICE.

LOUIS WEIMERSKIRCH, OF PITTSBURGH, PENNSYLVANIA.

TRAP.

1,284,165.  Specification of Letters Patent.  Patented Nov. 5, 1918.

Application filed March 28, 1918. Serial No. 225,354.

*To all whom it may concern:*

Be it known that I, LOUIS WEIMERSKIRCH, a citizen of the United States, and residing in the city of Pittsburgh, in the county of Allegheny and State of Pennsylvania, have invented or discovered new and useful Improvements in Traps, of which the following is a specification.

My invention consists in certain new and useful improvements in traps for sewers and similar purposes, and more particularly comprises a removable trap that may be lifted from its place when clogged for convenient cleansing.

Other novel features of structure and arrangement of parts will appear from the following description.

In the accompanying drawings, which are merely intended to illustrate a practical embodiment of my invention and not to limit the scope of the same to the construction shown, Figure 1 is a side elevation of the outer box or container with the trap members indicated in dotted lines; Fig. 2 is a side view of the trap frame and traps with the box in section to show its interior; Fig. 3 is a vertical cross section taken along the line III—III in Fig. 2; Fig. 4 is a view similar to Fig. 2, but showing the lid removed from the box and the trap frame moved outwardly to position the relief trap in the sewer line, and Fig. 5 is an end view of the trap frame showing the gasket or packing.

The following is a detailed description of the embodiment of my invention shown in the drawings.

A represents a box or outer container made of metal or any other suitable material. 1 is a removable wall, such as a top lid, of the box. 2 is an inlet connection and 3 an outlet connection by means of which the box may be connected up with the sewer. To maintain the usual drop in the sewer, it will be noticed that said connections are inclined and alined together.

B is a frame or support which makes a sliding fit in the box and may be raised or lowered as by means of a handle 4. C and D represent a pair of curved trap members having at their ends circumferential lips or flanges 5 which fit in seats or holes 6, in the end walls of the frame B. The two traps C and D are so positioned in the frame B, that when the frame is in its innermost position, as shown in Figs. 1 and 2, the upper or outer trap C registers with the inlet 2 and the outlet 3 and thus forms a part of the sewer, but when the frame is drawn upwardly or outwardly, as shown in Fig. 4, the trap member D registers with said inlet and outlet.

Of course it is necessary to prevent leakage between the trap and the sewer ends, and for this purpose I form a sunken panel 6ᵃ in each end wall of the frame surrounded by the outwardly extending flange 7, which flange however clears the wall of the box A as the frame is inserted or withdrawn. These panels are preferably of oblong shape, and surround the apertures in which fit the flanged ends of the trap members C and D. In each of said panels I mount a compressible gasket or packing 8, which may be cemented or otherwise secured in place and which is of sufficient thickness to be compressed when the frame B is inserted into the box A to make a tight joint between the box and the wall of the frame. Said gasket is provided with ports 9 which register with the ends of the traps and are of the same diameter as said traps. Thus when the frame is in position, the gasket is compressed against the outer faces of the end flanges of the trap members to prevent lateral escape of liquid or gas, but they do not in any way interfere with the passage of material through the trap. The edges of the gasket 8 are preferably beveled, as shown in Fig. 2, to prevent the edge of the gasket catching on the box wall when the frame is being moved.

Each trap may be provided with the usual vent pipe 10 which may connect with a common vent pipe 11, which latter may extend up through a hole in the lid 1.

In normal use the frame B is positioned so that the upper or outer trap C registers with the sewer inlet and outlet, but when the trap becomes clogged, the pipe 11 is disconnected, the lid 1 removed, and by means of the handle 4 the frame B is drawn into the position shown in Fig. 4, thus positioning the unclogged trap D between the inlet 2 and the outlet 3, thereby enabling the material dammed up in the sewer to empty out. Then the frame B may be withdrawn completely from the box so that the trap C may be opened up and cleaned. The frame is then reinserted with the box and positioned once more as shown in Figs. 1 and 2, ready for normal service. The lid is then replaced and the vent pipe 11 connected up.

For the sake of illustration, I have shown the trap members removable vertically but it is evident that they may be slid into the outer box horizontally or otherwise, where, as when placed under a closet bowl, it would be inconvenient to arrange them for vertical movement.

It is also evident that when the traps are removed, the open box provides a convenient means of access to the interior of the sewer for cleaning or other purposes.

What I desire to claim is:—

1. A trap mechanism adapted to be interposed between the abutting ends of a sewer or other passage and comprising a pair of trap pipes mounted to move in unison and adapted to be brought in turn into registration with said ends, for the purpose described.

2. A trap mechanism adapted to be interposed between the abutting ends of a sewer or other passage and comprising a support movable transversely between said ends, and a pair of trap pipes mounted in said support and adapted to be brought in turn into registration with said ends, for the purpose described.

3. A removable trap mechanism adapted to be interposed between the abutting ends of a sewer or other passage and comprising a container having an inlet port and an outlet port connected to said ends, a support adapted to be introduced into or removed from said container, and a pair of trap pipes mounted on said support and adapted to be brought in turn into registration with said ports by the movement of said support, for the purpose described.

LOUIS WEIMERSKIRCH.

Witnesses:
PATSY GRAND,
JOSEPH A. WEIMERSKIRCH.

Copies of this patent may be obtained for five cents each, by addressing the "Commissioner of Patents, Washington, D. C."